(12) United States Patent
George (10) Patent No.: US 9,706,049 B2
(45) Date of Patent: Jul. 11, 2017

(54) OUTBOUND INTERNAL CALLS INITIATED ON BEHALF OF A GROUP OF USERS

(71) Applicant: Avaya Inc., Santa Clara, CA (US)

(72) Inventor: Jibin George, Kochi (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/873,459

(22) Filed: Oct. 2, 2015

(65) Prior Publication Data

US 2017/0099389 A1 Apr. 6, 2017

(51) Int. Cl.
*H04W 4/06* (2009.01)
*H04M 3/46* (2006.01)
*H04W 4/16* (2009.01)

(52) U.S. Cl.
CPC ............. *H04M 3/465* (2013.01); *H04W 4/06* (2013.01); *H04W 4/16* (2013.01)

(58) Field of Classification Search
None
See application file for complete search history.

(56) References Cited

U.S. PATENT DOCUMENTS

| 9,215,641 | B1* | 12/2015 | Delker | H04L 12/66 |
| 2006/0270447 | A1* | 11/2006 | Everson | H04L 29/06027 |
| | | | | 455/552.1 |
| 2014/0133644 | A1* | 5/2014 | Vendrow | H04M 3/436 |
| | | | | 379/207.02 |

* cited by examiner

*Primary Examiner* — Diane Mizrahi
(74) *Attorney, Agent, or Firm* — Sheridan Ross P.C.

(57) ABSTRACT

Individuals often place calls on behalf of a group or collection of individuals. As provided herein, a caller may access or establish a group number to be presented to a callee. The callee then receives the call, such as by answering, caller identifier display, etc., and may wish to return the call. The callee then places a call to the group, rather than the individual who placed the call, which is then routed to members of the group. Any member of the group may then answer the call, thus avoiding issues associated with the originating caller being unavailable when any member of the group could address the purpose of the call. Additionally, status information may be automatically provided to allow group members to receive activity notification for calls to and/or from the group. For example, an indication that a call to an individual was placed on behalf of the group and, optionally, the status (e.g., answered, voicemail, etc.) of the call.

20 Claims, 7 Drawing Sheets

OUTBOUND INTERNAL CALLS INITIATED ON BEHALF OF A GROUP OF USERS

FIELD OF THE DISCLOSURE

The present disclosure is generally directed toward telephony communications.

BACKGROUND

In prior enterprise telephony systems, such as those utilizing a private branch exchange (PBX), a call is always initiated from a single party or recorded against an individual. Such solutions work well; however, often a call is made on behalf of two or more users. A party receiving the call, such as upon the party's voicemail system, may wish to return the call. To return the call, the party dials the number associated with the caller who may or may not be available.

The number may be associated with the individual placing the initial call. If the called party wishes to return the call, and the calling party is unavailable, the call may be unanswered or routed to voicemail, even if another of the two or more users are available to receive the call.

Figure 1:
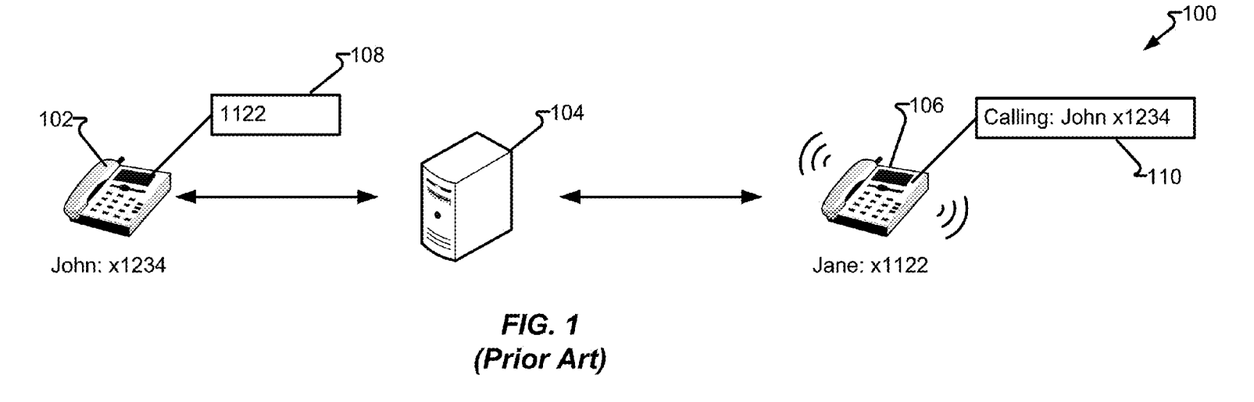
FIG. 1 depicts a communication system of the prior art.

FIG. 1 depicts communication system 100 of the prior art, which provides a well-known means for one party to call another party, whereby a caller utilizing calling endpoint 102 dials dialing sequence 108 comprising a destination address associated with called endpoint 106. Communication server 104, such as a private branch exchange (PBX) server, forwards the call to called endpoint 106, which presents display 110 comprising the calling party's name and/or extension. The called party may answer or not answer the call, such as when the call is routed to voicemail. If the called party wishes to return the call, the display 110 identifies the caller and may be utilized to place a return call. Despite the advantages of such systems, limitations and problems remain.

SUMMARY

It is with respect to the above issues and other problems that the embodiments presented herein were contemplated. With respect to certain embodiments provided herein, outbound calls placed on behalf of a group are provided. Prior art enterprise telephony systems, such as PBXs, are devoid of any indication that a call is placed on behalf of multiple parties or there are various parties interested in the purpose of the call. A called party who wishes to call back is only presented with the single calling party's origination number. With respect to embodiments provided herein, functionality is provided to a PBX to initiate a call on behalf of a group or virtual group (e.g., dynamic group, ad hoc group, etc.), which may provide an indication to the callee of the purpose of the call, as well as, provide a callback from the calling group.

For example, a group or plurality of individuals have a query to another group or individual in an enterprise, such as a development team that has a query about another product and the development manager instructs one individual to ask the question to the other group on behalf of the entire development team. In another example, a contact center has a particular domain expertise agent group and appoints a member to query another domain group. The member initiates the call on behalf of all of the concerned parties. When the call is initiated, it is marked as a multi-party originated call, or "group" call, by the caller.

If the group does not already exist within the PBX, a virtual user group may be created and provided with a new group number from the list of available numbers. For example, a call may be originated from an individual on behalf of the caller and the caller's manager. The caller selects their manager from the contacts list and a virtual group will be created by the PBX with two members.

Short codes can be defined in the system to indicate group calling. When a user dials a number with a particular short code, an option can be presented to the user to select the group or select the contacts to be included in a virtual group for that call. For virtual groups, naming of the group can be variously enabled. For example, the group may be a joining of the names of the group members. If such a joining results in a name-length exceeding a limit, the initials of one or more the individuals may be used. Once the group is created, the call will be initiated on behalf of a hunt group or the virtual group formed. A call log entry can be automatically made on the logs of the group members. As a benefit, once the call is made, each group member may be informed and the need for the caller to report the call to the other group members, via other channels, will be eliminated. Similarly, group members will be able to determine if a call has been made, and/or a completion status (e.g., answered, voicemail, etc.) associated with the call, without the need to directly inquire. In another embodiment, a caller may select a group name or virtual group name as per the naming conventions for the virtual group.

If the call is returned, the called party may call back to the same number. The original caller need not be present as the call is targeted towards the group and anyone in the group can answer the call. As all the concerned parties are aware of the call made or about the problem, any of the group members can answer the call and continue the conversation about the issue. If no further follow-up is required, the call can be marked as complete and the virtual agent group entry will be deleted from the PBX. The group can be informed of the call and/or any issue or resolution associated with the call by the PBX, log file, and/or push notification.

In one embodiment, a server is disclosed, comprising: a communication interface operable to connect a calling endpoint to a called endpoint; a processor configured to receive a calling endpoint address associated with the calling endpoint and, upon determining the calling endpoint address comprises a group identifier, causing the called endpoint to present a call from the calling endpoint to the called endpoint as originating from a group associated with the group identifier and comprising a plurality of group endpoints.

In one embodiment, a telephony endpoint is disclosed, comprising: an input interface operable to receive an address for a far endpoint; a communication interface operable to connect to a server configured to host a call between the telephony endpoint and the far endpoint; and wherein the input interface is further configured to receive a group call identifier and cause the server to forward the call to the far endpoint comprising an origin identifier associated with the group identifier.

In another embodiment, a method is disclosed, comprising: receiving at a server a call placed by a calling endpoint to a called endpoint; determining the call indicates a group origination; and forwarding the call to the called endpoint comprising an origination data header further comprising a group identifier.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 2:
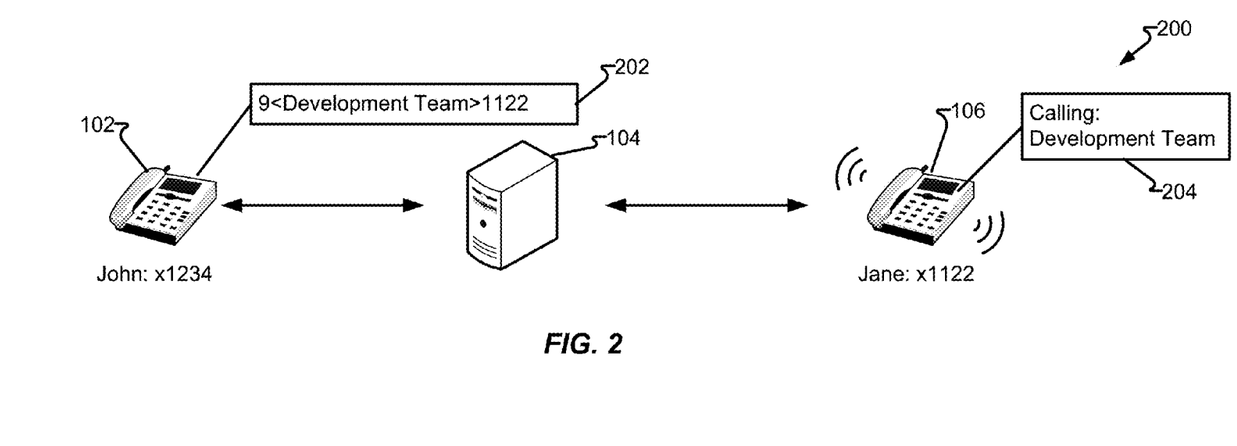
FIG. 2 depicts a first communication system in accordance with embodiments of the present disclosure.

FIG. 2 depicts communication system 200 in accordance with embodiments of the present disclosure. Calling endpoint 102 places a call to called endpoint 106 via communication server 104. In one embodiment, dialing sequence 202 comprises a group dialing indicator with an associated group identifier, as well as the address associated with called endpoint 106. Communication server 104 processes the request, such as a PBX receiving any call request for another in-network address. Server 104 determines dialing sequence 202 comprises a group dialing indicator (e.g., "9") and a group identifier (e.g., "Development Team").

It should be appreciated that the group dialing indicator may be variously embodied to accommodate a particular installation or to avoid conflicting with existing specialty dialing digits or codes. For example, the pound key ("#") or other telephony key may be utilized when the digit "9" is previously allocated to another purpose, such as accessing an outside line. In another example, a particular digit may be utilized when no other valid dialing sequence comprises such a digit.

Communication server 104, upon determining that a call placed to called endpoint 106 is being placed on behalf of a group, causes called endpoint 106 to be presented with informational message 204 identifying the calling party as the group. In one embodiment, a group comprises a number of individuals identified by at least one on a network accessible by communication server 104. In another embodiment, the group comprises a single individual endpoint address, which may or may not be associated with calling endpoint 102. For example, an administrative assistant may place a call to another party on behalf of another, such as an officer of the company, causing called endpoint 106 to present the call as if it originated from the company officer. However, it should be noted that in such embodiments, the calling party need not share the same extension as the party for which the call is being made.

Calling endpoint 102 and called endpoint 106 are variously embodied. Calling endpoint 102 may comprise a digital wired telephone, such as that featuring a detailed alphanumeric display, an analog telephone, which may or may not feature a display, a computer or other computational device operating a telephony application (e.g., soft phone), and/or a wireless telephone device configured to communicate via communication server 104. Calling endpoint 102 may present a full alphanumeric description, such as groups to select, and receive a user's input thereon. When embodied as a less feature-rich device, calling endpoint 102 may associate certain numeric keys with functions, present audio prompts, and/or spoken command processing.

Called endpoint 106 may similarly be embodied as a full-featured digital telephony endpoint, analog telephone, wireless telephone, and/or telephony application. Called endpoint 106 comprises a display or other means to present the user thereof with calling party identification. For example, called endpoint 106 may present an audio tone or spoken identification of the calling party, whether the calling party is an individual or group. Called endpoint 106 preferably comprises features that enable call-back to an identified calling address. It should be appreciated that for the purposes of avoiding undue complications to the figures, addresses disclosed herein are numeric. In another embodiment, addresses may be SIP addresses or other alphanumeric addresses (e.g., "username@company.com"). Accordingly, addresses implementing characters beyond digits 0-9 and the pound and asterisk symbols, may dictate that calling endpoint 102 and/or called endpoint 106 be similarly configured to accommodate alphanumeric inputs and outputs.

In another embodiment, additional communication components may be provided between calling endpoint 102 and called endpoint 106. For example, additional public (e.g., Internet, public switched telephone network) and/or private networks (e.g., LAN, WAN, WiMax, cellular, etc.) may be utilized to facilitate communication between calling endpoint 102 and called endpoint 106.

Figure 3:
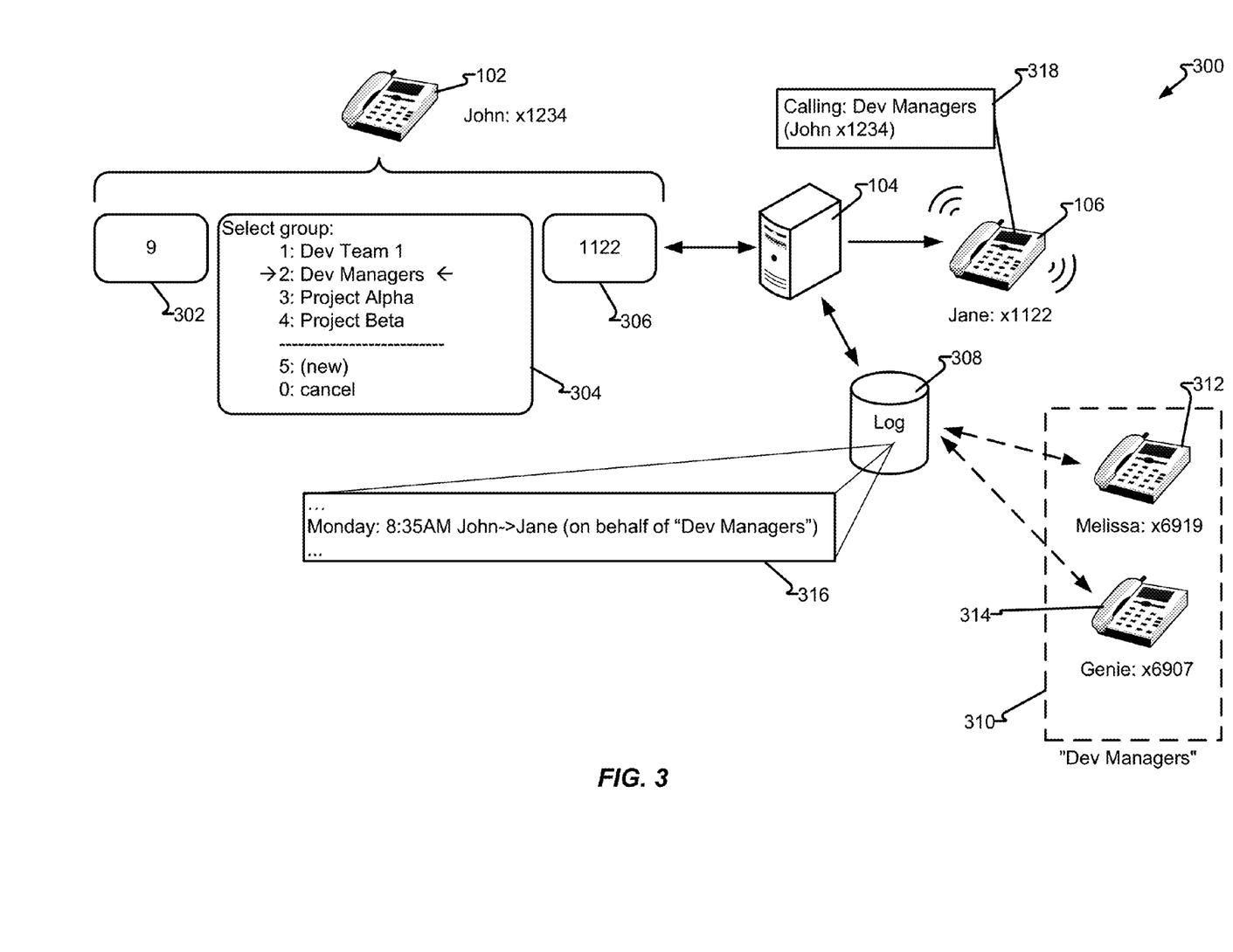
FIG. 3 depicts a second communication system in accordance with embodiments of the present disclosure.

FIG. 3 depicts communication system 300 in accordance with embodiments of the present disclosure. In one embodiment, system 300 illustrates a dialing sequence provided by calling endpoint 102. A user of calling endpoint 102 dials a group call identifier 302 causing communication server 104, or calling endpoint 102, to present group dialing menu 304. The user selects a particular option from group dialing menu 304 and the address 306 associated with the called endpoint 106. It should be appreciated that group dialing indicator 302 may be embodied as a command, menu option, function key, soft key, or other indicator of a group call.

Group dialing menu 304 is variously embodied. In one embodiment, group dialing menu 304 presents a list of groups for which the user associated with calling endpoint 102 is a member. In another embodiment, group dialing menu 304 presents a list of groups on whose behalf the user associated with calling endpoint 102 is authorized to make calls. In another embodiment, groups may be created on a permanent or temporary basis. For example, an input on group dialing menu 304 indicating a new group should be created (e.g. "5") may prompt the user to select the members, such as by name, extension, or other address, to be added to the group. The group may be provided with a name to facilitate identification, such as by the user of called endpoint 106 and/or future callers wishing to utilize the same group. Communication server 104 maintains the group name and its associated members. Incoming calls addressed to the group are then routed to the respective members of the group.

Once dialing has completed, the communication server 104 forwards the call comprising originating information, such as the group name or identifier, to the destination, such as called endpoint 106. Called endpoint 106 may then present calling information 318 indicating that a call is being received from a group, such as by presenting the name of the group, and, optionally, a particular individual calling on behalf of the group.

In another embodiment, communication server 104 may cause records 316 to be maintained in log 308. Log 308 and records 316 may be accessible such as by authorized users, which may comprise the individuals of group 310, as identified in records 316. In another embodiment, records 316, or indicia thereof, may be provided to group member endpoint 312, 314 via push-notification. For example, upon placing the call from a calling endpoint 102, on behalf of group 310, group members 312, 314 are provided notification to their respective endpoints and/or other notification addresses (e.g., email address, SMS device, etc.).

In another embodiment, a particular task may be associated with a call. For example, John, utilizing calling endpoint 102, is placing a call to Jane, utilizing called endpoint 106, on behalf of development managers Melissa and Genie, to request new budget information. Server 104 may then cause log 308 to record a message identifying the call as being associated with the task (e.g., requesting new budget information), make the record available, and/or provide a pitch notification to group member endpoints 312, 314.

Figure 4:
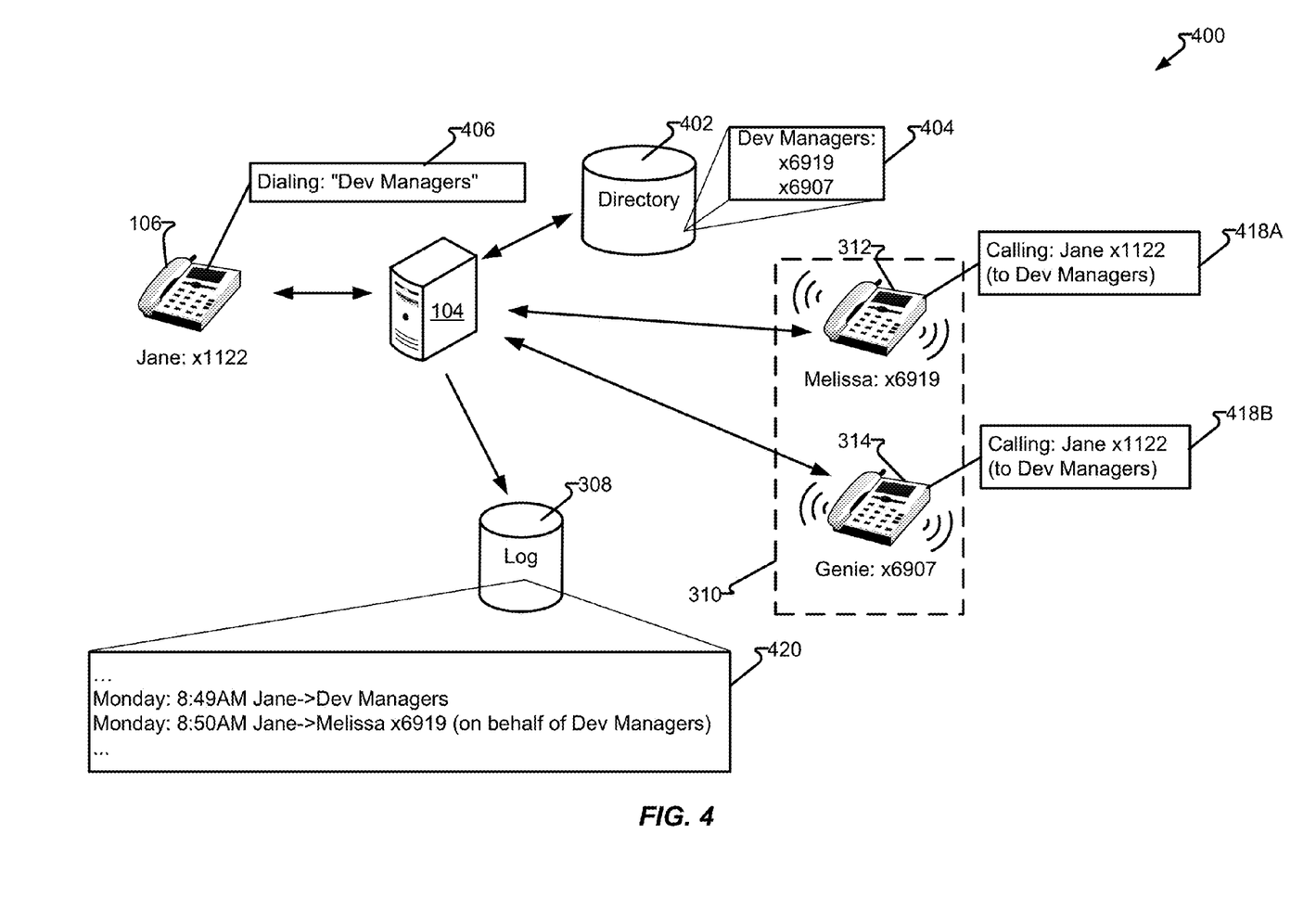
FIG. 4 depicts a third communication system in accordance with embodiments of the present disclosure.

FIG. 4 depicts communication system 400 in accordance with embodiments of the present disclosure. System 400 comprises components to enable the user associated with called endpoint 106 to return the call received from group 310. In one embodiment, called endpoint 106 inputs dialing sequence 406, which may further comprise the selection of the group from a display and/or receiving numeric or alphanumeric inputs upon called endpoint 106. Communication server 104 accesses directory 402 comprising a record 404. Record 404 further comprises the group identifier and the addresses of the members of the group, such as group endpoints 312, 314 of group 310.

Communication server 104 then places the call to group endpoints 312, 314. Informational display 418 optionally notifies users associated with group endpoints 312, 314 of the call and, as a further option, identifies the call as being a call-back to the group. The call may then be answered upon one of group endpoints 312, 314 and the call completed normally.

In another embodiment, communication server 104 may cause log 308 to record records 420. As a further option, records 420 may be provided to at least one of the group 310 members, such as each of group endpoints 312, 314 or to one of the group endpoints 312, 314, which did not answer the call. As yet a further option, the party placing the call, when not a member of group 310, such as calling endpoint 102, may also be provided records 420. Record 420 may be further associated with a particular task, whereby notification to group endpoints 312, 314, and/or calling endpoint 102 may further indicate the call in association with a particular task.

Figure 5A:
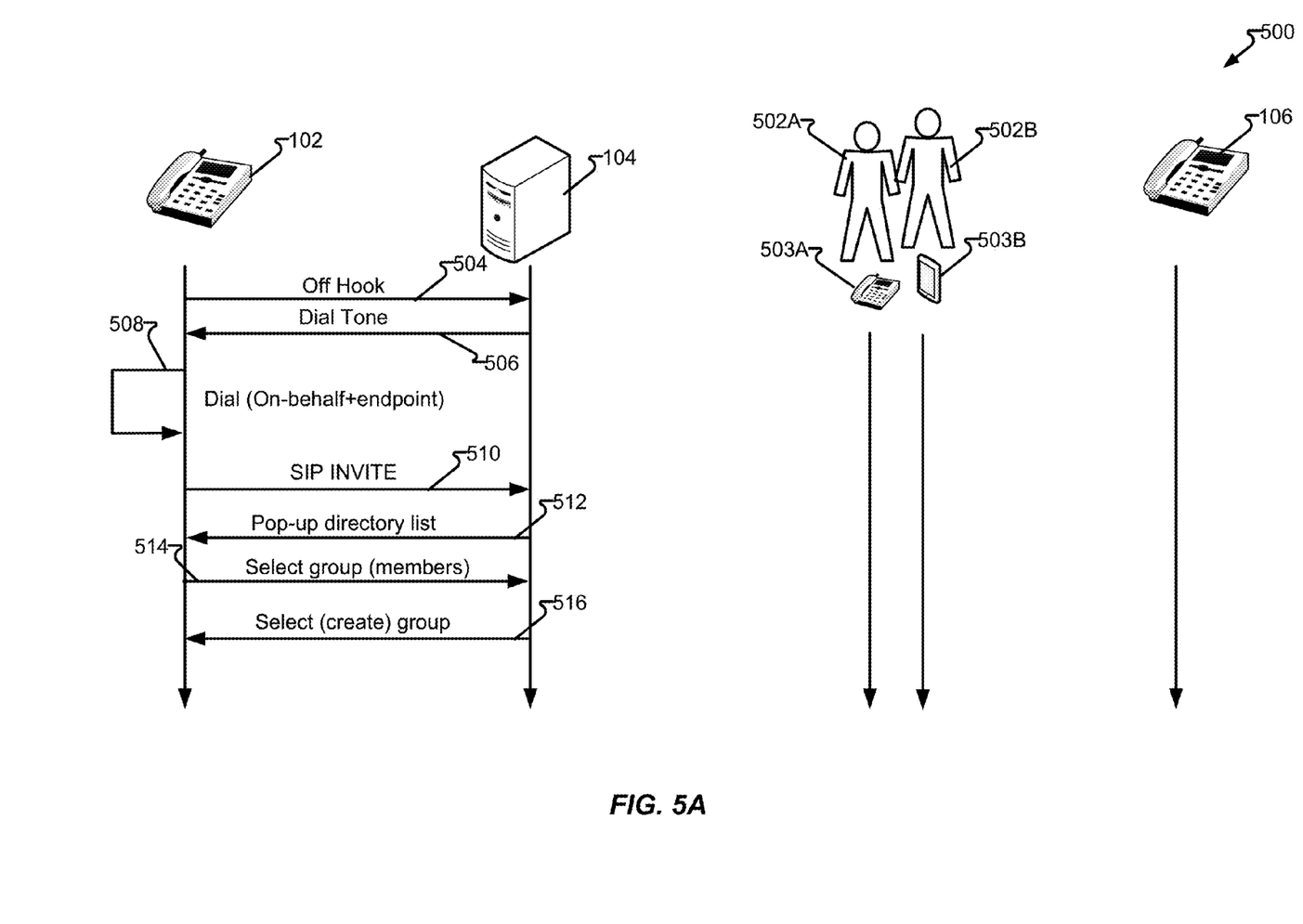
FIGS. 5A-5B depict an interaction in accordance with embodiments of the present disclosure.
Figure 5B:
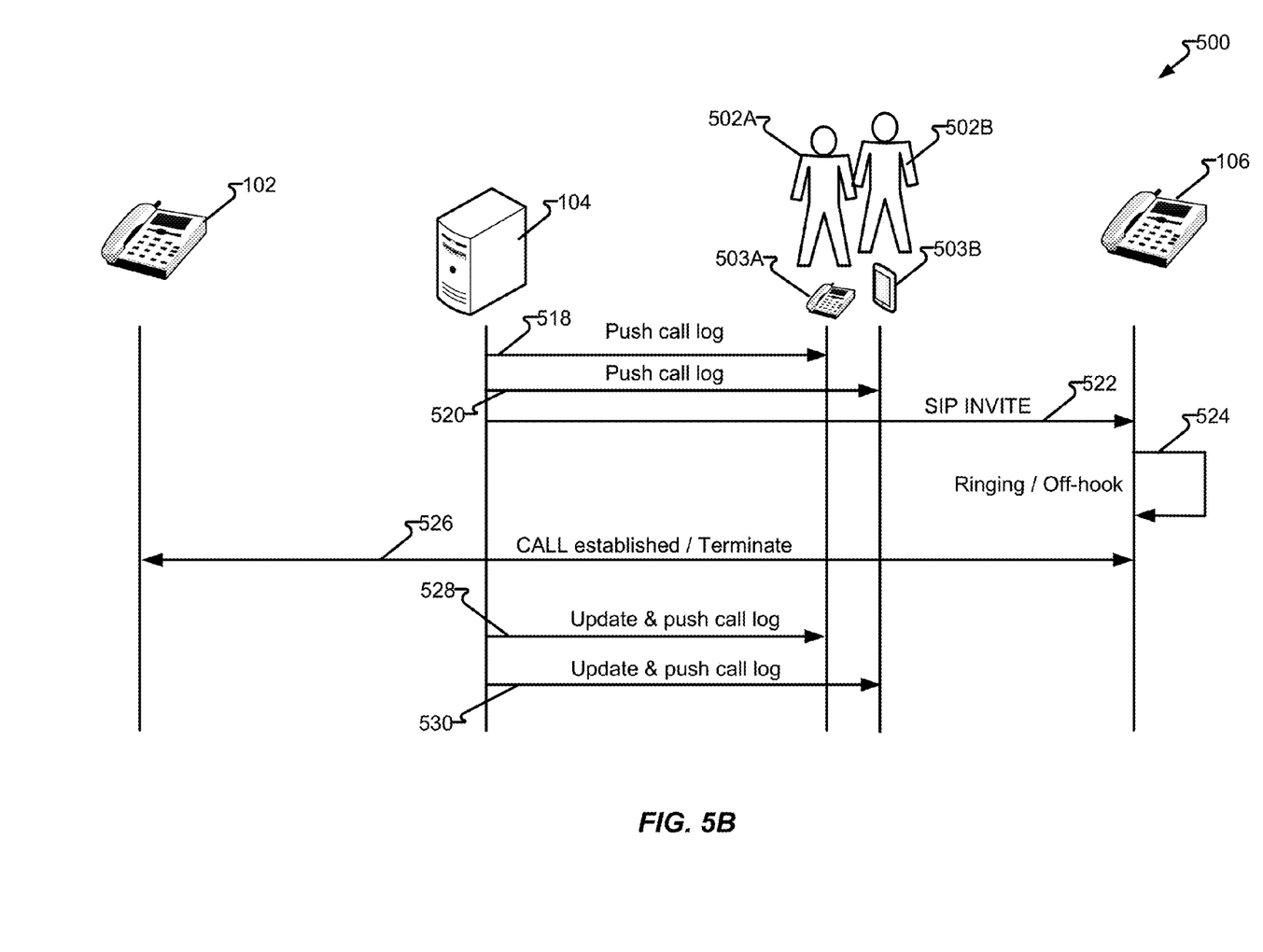

FIGS. 5A-5B depict interaction 500 in accordance with embodiments of the present disclosure. Interaction 500 illustrates one possible interaction between calling endpoint 102 and called endpoint 106 with notifications to group members 502A and 502B, utilizing group endpoints 503A and 503B, respectively. It should be appreciated that certain protocol messages may be added, removed, altered, and/or reordered without departing from the scope of the embodiments provided herein.

Calling endpoint 102 goes off hook 504, which causes communication server 104 to provide dial tone 506 to calling endpoint 102. Calling endpoint 102 initiates dialing 508, which may comprise numeric or alphanumeric address characters identifying called endpoint 106. SIP invite 510 is then sent to communication server 104, which responds with directory list 512 indicating a number of potential groups for which calling endpoint 102 may place calls. If a new group is to be created, group select 514 may provide a list of members for which a group may be created as indicated by message 516. In one embodiment, the name of the group may be provided by the user of calling endpoint 102. In another embodiment, the name of the group may be provided by mitigation server 104, which may comprise a machine-determined name, such as a concatenation of group members, a department associated with group members, or other grouping functionality. As a further option, the group name may be modified, which may cause communication server 104 to validate the name to ensure compliance with naming conventions and/or uniqueness.

Communication server 104 may provide notification to group members 502, such as by providing push log 518, 520 to devices 502B, 503B, respectively. SIP invite message 522 is then forwarded to called endpoint 106 for presentation thereon. Called endpoint 106, if not presently engaged, rings and, if selected by the user, goes off hook 524. Communication 526 provides for data exchange between called endpoint 106 and calling endpoint 102, such as by utilizing a real-time protocol (RTP). Upon completion of the call, communication server 104 may provide push notifications 528, 530 directly to group endpoints 503A, 503B and/or to a log repository, such as log 308. Should the call be associated with a particular task, communication server 104 directly or by causing another component and/or data repository to access a task, provides messages 518, 520, 528, and/or 530 to indicate the status of the call (e.g., call placed, call answered, left message, call completed, etc.) that is associated with the task (e.g., "call completed. RE: John to ask Jane about new budget information.").

Figure 6:
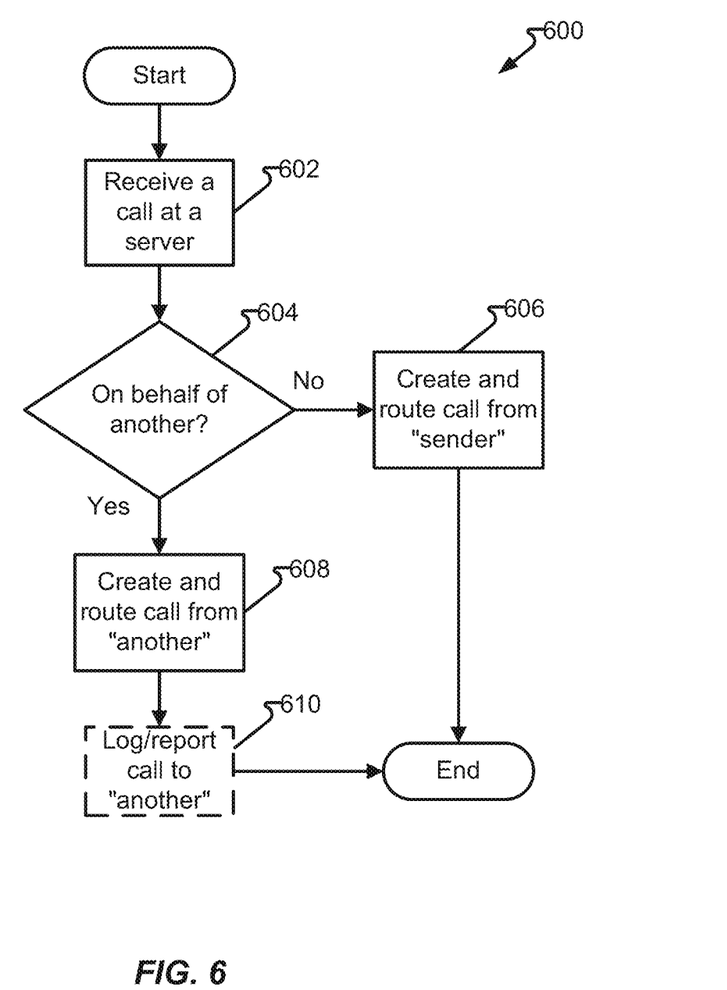
FIG. 6 depicts a first process in accordance with embodiments of the present disclosure.

FIG. 6 depicts process 600 in accordance with embodiments of the present disclosure. In one embodiment, process 600 begins at step 602 when a call is received at a server, such as by calling endpoint 102 placing a call to called endpoint 106, as received by communication server 104. Step 604 determines if the call is made on behalf of another. In one embodiment, the call is made on behalf of a group comprising a plurality of members associated with the plurality of group endpoints, such as group endpoints 312, 314.

If step 604 is determined in the negative, processing continues to step 606 whereby the call is not a group call on behalf of any other individual and the call is routed to its addressed destination and indicates that the sender and the originator are the same. Following step 606, process 600 may terminate. If step 604 is determined in the affirmative, processing continues to step 608 whereby the call is created and forwarded to the selected destination and indicates the originator is the other, such as a group or individual different from the originator. The call is then completed in the normal manner, such as being answered, ringing, ringing then routing to voicemail, forwarding, and/or other option as may be configured by the operator or administrator of the destination endpoint. Optionally, step 610 may create a log entry associated with the call and its associated status and, as a further option, its relationship with a particular task. The log entry may then be pushed to the "another" individual or group members.

Figure 7:
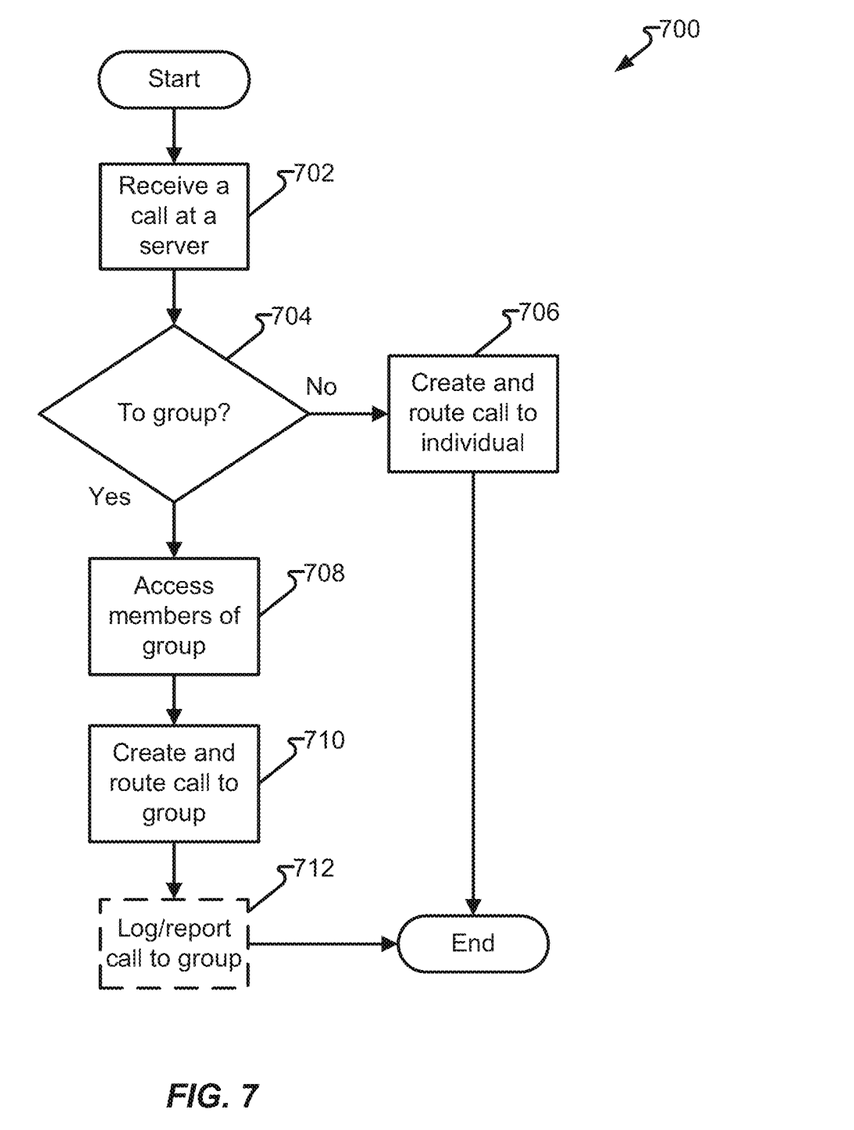
FIG. 7 depicts a second process in accordance with embodiments of the present disclosure.

FIG. 7 depicts process 700 in accordance with embodiments of the present disclosure. In one embodiment, a call that was previously placed to a called endpoint, such as called endpoint 106, indicates that the sender is a group. The called endpoint 106 selects the group, such as to return the call. Step 702 receives the call, such as a call from called endpoint 106 being returned to a group address via communication server 104. Step 704 determines if the call is destined to a group. If step 704 is determined in the negative, processing continues to step 706 whereby the call is routed to the destination address of the individual. Following step 706, process 700 may terminate.

If step 704 is determined in the affirmative, processing continues to step 708 whereby members of the group identified are accessed, such as by indication server 104 accessing directory 402. Step 710 then creates calls for forwarding to members of the group accessed in step 708. The call is then completed as normal, such as by one of the members answering the call and/or the call going to voicemail or otherwise left unanswered. Optionally, step 712 creates a log entry, which may be forwarded to a repository, such as log 308, and/or push notified to the members of the group or, as a further option, sent to the originator of the call if not otherwise a member of the group.

In the foregoing description, for the purposes of illustration, methods were described in a particular order. It should be appreciated that in alternate embodiments, the methods may be performed in a different order that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A server, comprising:
   a communication interface to connect a calling endpoint to a called endpoint; and
   a processor to:
   receive, via the communication interface, a call from a calling endpoint and comprising a called endpoint address; and
   upon determining the called endpoint address comprises a group identifier, cause the called endpoint to present the call to the called endpoint, wherein the presentation of the call comprises an indication of the call as originating from a group associated with the group identifier.

2. The server of claim 1, wherein the processor:
   upon the processor determining the endpoint contains the group identifier, further causes the called endpoint to present the call, the presentation comprising the calling endpoint and the group associated with the group identifier.

3. The server of claim 1, wherein the processor further receives a call completion status associated with the call and, in response thereto, causes the call completion status to be made available for presentation to a number of endpoints associated with the group identifier.

4. The server of claim 1, wherein:
   a task is associated with the call; and
   the processor further causes a task status associated with the task to be presented to a number of endpoints associated with the group identifier.

5. The server of claim 1, the processor further:
   receives a group origination signal from the calling endpoint, wherein the group origination signal indicates an address of a group will be provided to the call as the originator of the call;
   causes a set of groups to be presented to the calling endpoint for selection by a user of the calling endpoint;
   receives, in response to an input on the calling endpoint, a selected group from the set of groups; and
   sets the called endpoint address to comprise the group identifier associated with the selected group.

6. The server of claim 1, further comprising, a data store configured to store a record of the group identifier and a plurality of group endpoints associated with the group identifier.

7. The server of claim 6, wherein the processor, upon receiving the call to the group identifier, further causes the communication interface to forward the call to the plurality of group endpoints.

8. The server of claim 7, wherein the processor further causes each of the plurality of group endpoints to present the call and the group associated with the group identifier.

9. The server of claim 6, wherein the processor further receives indicia from the calling endpoint indicating a new group comprising at least one new group endpoint and causes the data store to store indicia of the new group as the group identifier and to further cause the data store to store the at least one new group endpoint as the plurality of group endpoints.

10. The server of claim 9, the processor further automatically creates the group identifier as a function of a user name associated with each of at least two of the plurality of group endpoints.

11. A telephony endpoint, comprising:
    an input interface operable to receive an input associated with an address for a far endpoint;
    a communication interface connected to a server configured to host a call between the telephony endpoint and the far endpoint; and
    the input interface, upon originating the call to the far endpoint, accesses a group call identifier associated with the address for the far endpoint and causes the server to forward the call to the far endpoint comprising an origin identifier associated with the group call identifier.

12. The telephony endpoint of claim 11, wherein the origin identifier comprises a name associated with the group call identifier.

13. The telephony endpoint of claim 11, wherein the input interface is further operable to present a number of candidate endpoints for selection and, upon receiving a selection of the number of candidate endpoints, signal the server to create a group comprising the selected number of candidate endpoints and associated with the group call identifier.

14. The telephony endpoint of claim 13, wherein the input interface is further configured to receive the group call identifier from the input interface.

15. The telephony endpoint of claim 11, further comprising a display configured to, upon receiving a group call indicator from the interface, present a list of available groups and receive a selection indicating one of the list of available groups and set the group call identifier in accordance with the selected one of the list of available groups.

16. A method, comprising:
    receiving, at a server, a call placed by a calling endpoint to a called endpoint;
    upon determining, by the server operable to forward the call to the called endpoint, the call selectively comprising an origination data header comprising at least one of an identifier associated with the calling endpoint and an identifier associated with a group, that the call indicates a group origination, accessing a group identifier associated with the calling endpoint; and forwarding the call to the called endpoint, the origination data header further comprising the identifier associated with the group.

17. The method of claim 16, wherein accessing the group identifier comprises receiving the group identifier from the calling endpoint.

18. The method of claim 16, further comprising:
receiving a call completion status associated with the call placed to the called endpoint; and
providing the call completion status available to a number of endpoints each associated with the group identifier.

19. The method of claim 18, further comprising:
associating a task with the call;
receiving a task status of the task following the call; and
providing the task status to the number of endpoints associated with the group identifier.

20. The method of claim 16, further comprising:
receiving the group origination signal from the calling endpoint;
causing a set of groups to be presented to the calling endpoint for selection;
receiving a selection of one group from the set of groups; and
setting the identifier associated with the group to indicate the selected one group.

* * * * *

UNITED STATES PATENT AND TRADEMARK OFFICE
CERTIFICATE OF CORRECTION

PATENT NO. : 9,706,049 B2  
APPLICATION NO. : 14/873459  
DATED : July 11, 2017  
INVENTOR(S) : Jibin George It is certified that error appears in the above-identified patent and that said Letters Patent is hereby corrected as shown below:

In the Claims

At Column 9, Line 63, Claim 5 after "The server of claim 1," please add --wherein-- therein.

At Column 10, Line 25, Claim 10 after "The server of claim 9," please add --wherein-- therein.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*